(12) United States Patent
Han et al.

(10) Patent No.: US 12,071,101 B2
(45) Date of Patent: *Aug. 27, 2024

(54) REAL-TIME REMOTE CONTROL OF VEHICLES WITH HIGH REDUNDANCY

(71) Applicant: TUSIMPLE, INC., San Diego, CA (US)

(72) Inventors: Xiaoling Han, San Diego, CA (US); Charles A. Price, Los Altos, CA (US); Lindong Sun, San Diego, CA (US); Liu Liu, San Diego, CA (US); Yi Wang, San Diego, CA (US); Ruiliang Zhang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/660,519

(22) Filed: Apr. 25, 2022

(65) Prior Publication Data

US 2022/0242371 A1    Aug. 4, 2022

Related U.S. Application Data

(63) Continuation of application No. 16/243,821, filed on Jan. 9, 2019, now Pat. No. 11,312,334.

(Continued)

(51) Int. Cl.
*G05D 1/00* (2024.01)
*B60R 25/30* (2013.01)
(Continued)

(52) U.S. Cl.
CPC .......... *B60R 25/30* (2013.01); *G05D 1/0022* (2013.01); *G05D 1/0077* (2013.01); *H04W 4/80* (2018.02); *H04W 84/042* (2013.01); *H04W 84/12* (2013.01)

(58) Field of Classification Search
None
See application file for complete search history.

(56) References Cited

U.S. PATENT DOCUMENTS 5,825,283 A   10/1998   Camhi
6,084,870 A   7/2000   Wooten et al.
(Continued)

FOREIGN PATENT DOCUMENTS

CN       1484205 A  *  3/2004
CN     106340197 A      1/2017
(Continued)

OTHER PUBLICATIONS

English translation of CN-1484205 (Year: 2004).*

(Continued)

*Primary Examiner* — Daniel L Greene
(74) *Attorney, Agent, or Firm* — Perkins Coie LLP

(57) ABSTRACT

Described are devices, systems and methods for real-time remote control of vehicles with high redundancy. In some embodiments, two copies of at least one control command are received using two different wireless communication protocols, and are compared. The at least one control command is executed when the two copies are in agreement, but is rejected when the two copies differ. In other embodiments, additional wireless communication protocols may exist to provide a redundant mode of communication when one of the two different wireless communication protocols are unavailable. In yet other embodiments, redundant GPS units may be used to determine availability of any of the communication protocols, and relevant control commands may be downloaded in advance to circumvent a lack of coverage.

20 Claims, 9 Drawing Sheets

Related U.S. Application Data

(60) Provisional application No. 62/615,377, filed on Jan. 9, 2018.

(51) Int. Cl.
  *H04W 4/80* (2018.01)
  *H04W 84/04* (2009.01)
  *H04W 84/12* (2009.01)

(56) References Cited

U.S. PATENT DOCUMENTS

| | | |
|---|---|---|
| 6,263,088 B1 | 7/2001 | Crabtree |
| 6,594,821 B1 | 7/2003 | Banning et al. |
| 6,777,904 B1 | 8/2004 | Degner |
| 6,975,923 B2 | 12/2005 | Spriggs |
| 7,103,460 B1 | 9/2006 | Breed |
| 7,689,559 B2 | 3/2010 | Canright |
| 7,742,841 B2 | 6/2010 | Sakai et al. |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,346,480 B2 | 1/2013 | Trepagnier et al. |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,706,394 B2 | 4/2014 | Trepagnier et al. |
| 8,718,861 B1 | 5/2014 | Montemerlo et al. |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,983,708 B2 | 3/2015 | Choe et al. |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,214,084 B2 | 12/2015 | Grauer et al. |
| 9,219,873 B2 | 12/2015 | Grauer et al. |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman et al. |
| 9,317,776 B1 | 4/2016 | Honda |
| 9,330,334 B2 | 5/2016 | Lin |
| 9,342,074 B2 | 5/2016 | Dolgov |
| 9,347,779 B1 | 5/2016 | Lynch |
| 9,355,635 B2 | 5/2016 | Gao |
| 9,365,214 B2 | 6/2016 | Ben Shalom |
| 9,399,397 B2 | 7/2016 | Mizutani |
| 9,418,549 B2 | 8/2016 | Kang et al. |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,483,839 B1 | 11/2016 | Kwon |
| 9,490,064 B2 | 11/2016 | Hirosawa |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,555,803 B2 | 1/2017 | Pawlicki |
| 9,568,915 B1 | 2/2017 | Berntorp |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali |
| 9,669,827 B1 | 6/2017 | Ferguson et al. |
| 9,672,446 B1 | 6/2017 | Vallesi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris |
| 9,723,099 B2 | 8/2017 | Chen |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,953,236 B1 | 4/2018 | Huang |
| 10,147,193 B2 | 12/2018 | Huang |
| 10,223,806 B1 | 3/2019 | Yi et al. |
| 10,223,807 B1 | 3/2019 | Yi et al. |
| 10,410,055 B2 | 9/2019 | Wang et al. |
| 2003/0114980 A1 | 6/2003 | Klausner et al. |
| 2003/0174773 A1 | 9/2003 | Comaniciu |
| 2003/0188216 A1 | 10/2003 | Elko et al. |
| 2003/0222770 A1 | 12/2003 | Lesesky et al. |
| 2004/0198386 A1 | 10/2004 | Dupray |
| 2004/0264763 A1 | 12/2004 | Mas et al. |
| 2005/0049021 A1 | 3/2005 | Nedelcu et al. |

(56) References Cited

U.S. PATENT DOCUMENTS

| | | | |
|---|---|---|---|
| 2005/0131645 A1* | 6/2005 | Panopoulos | G05D 1/0244 |
| | | | 701/472 |
| 2007/0128899 A1 | 6/2007 | Mayer | |
| 2007/0183661 A1 | 8/2007 | El-Maleh | |
| 2007/0183662 A1 | 8/2007 | Wang | |
| 2007/0230792 A1 | 10/2007 | Shashua | |
| 2007/0286526 A1 | 12/2007 | Abousleman | |
| 2008/0249667 A1 | 10/2008 | Horvitz | |
| 2009/0040054 A1 | 2/2009 | Wang | |
| 2009/0087029 A1 | 4/2009 | Coleman | |
| 2009/0327288 A1 | 12/2009 | Silverman | |
| 2010/0049397 A1 | 2/2010 | Lin | |
| 2010/0111417 A1 | 5/2010 | Ward | |
| 2010/0142447 A1 | 6/2010 | Schlicht | |
| 2010/0226564 A1 | 9/2010 | Marchesotti | |
| 2010/0281361 A1 | 11/2010 | Marchesotti | |
| 2010/0332654 A1 | 12/2010 | Bose et al. | |
| 2011/0142283 A1 | 6/2011 | Huang | |
| 2011/0191465 A1 | 8/2011 | Hoefstaedter | |
| 2011/0206282 A1 | 8/2011 | Aisaka | |
| 2011/0247031 A1 | 10/2011 | Jacoby | |
| 2012/0041636 A1 | 2/2012 | Johnson et al. | |
| 2012/0105639 A1 | 5/2012 | Stein | |
| 2012/0140076 A1 | 6/2012 | Rosenbaum | |
| 2012/0274629 A1 | 11/2012 | Baek | |
| 2012/0303786 A1* | 11/2012 | Brown | H04L 67/56 |
| | | | 709/223 |
| 2012/0314070 A1 | 12/2012 | Zhang et al. | |
| 2013/0051613 A1 | 2/2013 | Bobbitt et al. | |
| 2013/0083959 A1 | 4/2013 | Owechko | |
| 2013/0114446 A1 | 5/2013 | Liu | |
| 2013/0182134 A1 | 7/2013 | Grundmann et al. | |
| 2013/0204465 A1 | 8/2013 | Phillips et al. | |
| 2013/0226371 A1 | 8/2013 | Rovik | |
| 2013/0266187 A1 | 10/2013 | Bulan | |
| 2013/0329052 A1 | 12/2013 | Chew | |
| 2014/0005859 A1 | 1/2014 | Baskin et al. | |
| 2014/0072170 A1 | 3/2014 | Zhang | |
| 2014/0104051 A1 | 4/2014 | Breed | |
| 2014/0129060 A1 | 5/2014 | Cooper et al. | |
| 2014/0142799 A1 | 5/2014 | Ferguson et al. | |
| 2014/0143839 A1 | 5/2014 | Ricci | |
| 2014/0145516 A1 | 5/2014 | Hirosawa | |
| 2014/0198184 A1 | 7/2014 | Stein | |
| 2014/0277838 A1 | 9/2014 | Flick | |
| 2014/0321704 A1 | 10/2014 | Partis | |
| 2014/0334668 A1 | 11/2014 | Saund | |
| 2014/0358414 A1 | 12/2014 | Ibrahim et al. | |
| 2015/0062304 A1 | 3/2015 | Stein | |
| 2015/0269438 A1 | 9/2015 | Samarsekera et al. | |
| 2015/0310370 A1 | 10/2015 | Burry | |
| 2015/0353082 A1 | 12/2015 | Lee et al. | |
| 2016/0008988 A1 | 1/2016 | Kennedy | |
| 2016/0026787 A1 | 1/2016 | Nairn et al. | |
| 2016/0037064 A1 | 2/2016 | Stein | |
| 2016/0094774 A1 | 3/2016 | Li | |
| 2016/0118080 A1 | 4/2016 | Chen | |
| 2016/0129907 A1 | 5/2016 | Kim | |
| 2016/0165157 A1 | 6/2016 | Stein | |
| 2016/0210528 A1 | 7/2016 | Duan | |
| 2016/0241702 A1 | 8/2016 | Gorajala Chandra | |
| 2016/0275766 A1 | 9/2016 | Venetianer et al. | |
| 2016/0321381 A1 | 11/2016 | English | |
| 2016/0334230 A1 | 11/2016 | Ross et al. | |
| 2016/0342837 A1 | 11/2016 | Hong et al. | |
| 2016/0347322 A1 | 12/2016 | Clarke et al. | |
| 2016/0373944 A1 | 12/2016 | Jian | |
| 2016/0375907 A1 | 12/2016 | Erban | |
| 2017/0052522 A1 | 2/2017 | Klein et al. | |
| 2017/0053169 A1 | 2/2017 | Cuban et al. | |
| 2017/0061632 A1 | 3/2017 | Linder et al. | |
| 2017/0076279 A1 | 3/2017 | Pebbles et al. | |
| 2017/0083026 A1 | 3/2017 | Schmidt et al. | |
| 2017/0120846 A1 | 5/2017 | Gupta | |
| 2017/0124476 A1 | 5/2017 | Levinson et al. | |
| 2017/0134631 A1 | 5/2017 | Zhao et al. | |
| 2017/0177951 A1 | 6/2017 | Yang et al. | |
| 2017/0247112 A1 | 8/2017 | Horner | |
| 2017/0301104 A1 | 10/2017 | Qian | |
| 2017/0302733 A1 | 10/2017 | Borlick et al. | |
| 2017/0305423 A1 | 10/2017 | Green | |
| 2017/0318407 A1 | 11/2017 | Meister | |
| 2017/0357259 A1 | 12/2017 | Foster et al. | |
| 2017/0371608 A1* | 12/2017 | Wasserman | G07C 5/008 |
| 2018/0097905 A1 | 4/2018 | Todasco | |
| 2018/0151063 A1 | 5/2018 | Pun | |
| 2018/0158197 A1 | 6/2018 | Dasgupta | |
| 2018/0260956 A1 | 9/2018 | Huang | |
| 2018/0283892 A1 | 10/2018 | Behrendt | |
| 2018/0373980 A1 | 12/2018 | Huval | |
| 2019/0025853 A1 | 1/2019 | Julian | |
| 2019/0065863 A1 | 2/2019 | Luo et al. | |
| 2019/0066329 A1 | 2/2019 | Yi et al. | |
| 2019/0066330 A1 | 2/2019 | Yi et al. | |
| 2019/0066344 A1 | 2/2019 | Yi et al. | |
| 2019/0108384 A1 | 4/2019 | Wang et al. | |
| 2019/0132391 A1 | 5/2019 | Thomas | |
| 2019/0132392 A1 | 5/2019 | Liu | |
| 2019/0210564 A1 | 7/2019 | Han | |
| 2019/0210613 A1 | 7/2019 | Sun | |
| 2019/0236950 A1 | 8/2019 | Li | |
| 2019/0266420 A1 | 8/2019 | Ge | |

FOREIGN PATENT DOCUMENTS

| | | |
|---|---|---|
| CN | 106781591 A | 5/2017 |
| CN | 107343266 A | 11/2017 |
| CN | 107390689 A | 11/2017 |
| CN | 108010360 A | 5/2018 |
| DE | 2608513 A1 | 9/1977 |
| DE | 202013100347 U1 | 3/2013 |
| EP | 890470 B1 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2889772 A1 | 7/2015 |
| EP | 2946336 A2 | 11/2015 |
| EP | 2993654 A1 | 3/2016 |
| EP | 3081419 A1 | 10/2016 |
| JP | 2009272906 A | 11/2009 |
| JP | 2014228550 A | 12/2014 |
| KR | 100802511 A1 | 2/2008 |
| WO | 1991009375 A1 | 6/1991 |
| WO | 01/43440 A1 | 6/2001 |
| WO | 2005098739 A1 | 10/2005 |
| WO | 2005098751 A1 | 10/2005 |
| WO | 2005098782 A1 | 10/2005 |
| WO | 2010109419 A | 9/2010 |
| WO | 2013045612 A1 | 4/2013 |
| WO | 2014111814 A2 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |
| WO | 2017079349 A1 | 5/2017 |
| WO | 2017079460 A2 | 5/2017 |
| WO | 2018067362 A1 | 4/2018 |
| WO | 2017013875 A1 | 5/2018 |
| WO | 2019040800 A1 | 2/2019 |
| WO | 2019084491 A1 | 5/2019 |
| WO | 2019084494 A1 | 5/2019 |
| WO | 2019140277 A2 | 7/2019 |
| WO | 2019168986 A1 | 9/2019 |

OTHER PUBLICATIONS

Chinese Patent Office, 1st Chinese Office Action for CN Appl. No. 201980007921.1, mailed on Apr. 25, 2023, 5 pages.

(56) References Cited

OTHER PUBLICATIONS

Chinese Patent Office, Search Report for CN Appl. No. 201980007921.1, mailed on Apr. 24, 2023, 5 pages.

Sotzing, Chris C., et al.; "A Multi-Agent Architecture to Increase Coordination Efficient in Multi-AUV Operations," IEEE Conference Publication, Oceans 2007—Europe, Jun. 18-21, 2007.

Ahn, Kyoungho, Hesham Rakha, "The Effects of Route Choice Decisions on Vehicle Energy Consumption and Emissions", Virginia Tech Transportation Institute, Blacksburg, VA 24061, pp. 1-34, date unknown.

Athanasiadis, Thanos, et al., "Semantic Image Segmentation and Object Labeling", IEEE Transactions on Circuits and Systems for Video Technology, vol. 17, No. 3, pp. 1-15, Mar. 2007.

Bar-Hillel, Aharon et al. "Recent progress in road and lane detection: a survey." Machine Vision and Applications 25 (2011): 727-745.

Barth, Matthew et al., "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 1-11, date unknown.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690, pp. 1-6, Springer, Cham.

Cordts, Marius et al., "The Cityscapes Dataset for Semantic Urban Scene Understanding", Proceedings of the IEEE Computer Society Conference on Computer Vision and Pattern Recognition (CVPR), Las Vegas, Nevada, Apr. 7, 2016, pp. 1-29.

Dai, Jifeng, et al. "Instance-aware Semantic Segmentation via Multi-task Network Cascades", arXiv:CVPR, pp. 1, Dec. 14, 2015.

Engel, J. et la. "LSD-SLAM: Large Scare Direct Monocular SLAM," pp. 1-16, Munich.

Geiger, Andreas et al., "Automatic Camera and Range Sensor Calibration using a single Shot", Robotics and Automation (ICRA), pp. 1-8, 2012 IEEE International Conference.

Guarneri, P. et al., "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Dynamic Visual Attention: Searching for Coding Length Increments", Advances in Neural Information Processing Systems, vol. 21, pp. 681-688, 2008.

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi, "Computational Modeling and Psychophysics in Low and Mid-Level Vision", California Institute of Technology, pp. 1-125, May 7, 2014.

Hou, Xiaodi, et al. "A Meta-Theory of Boundary Detection Benchmarks", arXiv preprint arXiv: 1302.5985, pp. 1-4, Feb. 25, 2013.

Hou, Xiaodi, et al. "Image Signature: Highlighting Sparse Salient Regions", IEEE Transactions on Pattern Analysis and Machine Intelligence, vol. 34, No. 1, pp. 194-201, 2012.

Huval, Brody et al., "An Empirical Evaluation of Deep Learning on Highway Driving", arXiv:1504.01716v3 [cs.RO], pp. 1-7, Apr. 17, 2015.

International Application No. PCT/US18/53795, International Search Report and Written Opinion Mailed Dec. 31, 2018.

International Application No. PCT/US18/57484, International Search Report and Written Opinion Mailed Jan. 7, 2019.

International Application No. PCT/US19/12934, International Preliminary Report on Patentability Mailed Jul. 23, 2020, pp. 1-8.

International Application No. PCT/US19/12934, International Search Report and Written Opinion Mailed Apr. 29, 2019.

International Application No. PCT/US19/25995, International Search Report and Written Opinion Mailed Jul. 9, 2019.

International Application No. PCT/US2018/047608, International Search Report and Written Opinion Mailed Dec. 28, 2018.

International Application No. PCT/US2018/047830, International Search Report and Written Opinion Mailed Dec. 28, 2018.

International Application No. PCT/US2018/057851, International Search Report and Written Opinion Mailed Feb. 1, 2019.

International Application No. PCT/US2019/013322, International Search Report and Written Opinion Mailed Apr. 2, 2019.

International Application No. PCT/US2019/019839, International Search Report and Written Opinion Mailed May 23, 2019.

Jain, Suyong Dutt, et al. "Active Image Segmentation Propagation", In Proceedings of the IEEE Conference on Computer Vision and Pattern Recognition (CVPR), Las Vegas, pp. 1-10, Jun. 2016.

Kendall, Alex, Gal, Yarin, "What Uncertainties Do We Need in Bayesian Deep Learning for Computer Vision", arXiv:1703.04977v1 [cs.CV], pp. 1-11, Mar. 15, 2017.

Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.

Li, Tian, "Proposal Free Instance Segmentation Based on Instance-aware Metric", Department of Computer Science, Cranberry-Lemon University, Pittsburgh, PA., pp. 1-2, date unknown.

Li, Yanghao, "Demystifying Neural Style Transfer", arXiv preprint arXiv:1701.01036, pp. 1-8, Jan. 4, 2017.

Li, Yanghao, et al. "Revisiting Batch Normalization for Practical Domain Adaptation", arXiv preprint arXiv:1603.04779, pp. 1-12, Nov. 8, 2016.

Li, Yanghao, et al., "Factorized Bilinear Models for Image Recognition", arXiv preprint arXiv:1611.05709, pp. 1-9, Nov. 17, 2016.

Li, Yin, Xiaodi et al., "The Secrets of Salient Object Segmentation", Proceedings of the IEEE Conference on Computer Vision and Pattern Recognition, pp. 280-287, 2014.

Luo, Yi et al. U.S. Appl. No. 15/684,389 Notice of Allowance Mailed Oct. 9, 2019, pp. 1-9.

MacAodha, Oisin, et al. "Hierarchical Subquery Evaluation for Active Learning on a Graph", In Proceedings of the IEEE Conference on Computer Vision and Pattern Recognition (CVPR), pp. 1-8, 2014.

Mur-Artal, R. et al., "Orb-Slam: A Versatile and Accurate Monocular Slam System," IEEE Transaction on Robotics, Oct. 2015, pp. 1147-1163, vol. 31, No. 5, Spain.

Norouzi, Mohammad, et al., "Hamming Distance Metric Learning", Departments of Computer Science and Statistics, University of Toronto, pp. 1-9, date unknown.

Office Action Mailed in Chinese Application No. 201810025516.X, Mailed Sep. 3, 2019, pp. 1-62.

Paszke, Adam et al., "Enet: A deep neural network architecture for real-time semantic segmentation." CoRR, abs/1606.02147, pp. 1-10, Jun. 7, 2016.

Ramos, Sebastian, et al. "Detecting Unexpected Obstacles for Self-Driving Cars: Fusing Deep Learning and Geometric Modeling", arXiv:1612.06573v1 [cs.CV], pp. 1-8, Dec. 20, 2016.

(56) References Cited

OTHER PUBLICATIONS

Richter, Stephan R., et al. "Playing for Data: Ground Truth from Computer Games", Intel Labs, European Conference on Computer Vision (ECCV), Amsterdam, the Netherlands, pp. 1-16, (2016).
Sattler, T. et al., "Are Large-Scale 3D Models Really Necessary for Accurate Visual Localization?" CVPR, IEEE, 2017, pp. 1-10.
Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.
Schroff, Florian, et al. (Google), "FaceNet: A Unified Embedding for Face Recognition and Clustering", arXiv: CVPR, pp. 1-10, Jun. 17, 2015.
Somani, Adhira et al., "Despot: Online POMDP Planning with Regularization", Department of Computer Science, National University of Singapore, pp. 1-9, date unknown.
Spinello, Luciano, et al., "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
Szeliski, Richard, "Computer Vision: Algorithms and Applications" http://szeliski.org/Book/, pp. 1-2, (2010).
Wang, Panqu, et al., "Understanding Convolution for Semantic Segmentation", arXiv preprint arXiv:1702.08502, pp. 1-10, Feb. 27, 2017.
Wei, Junqing, et al. "A Prediction- and Cost Function-Based Algorithm for Robust Autonomous Freeway Driving", 2010 IEEE Intelligent Vehicles Symposium, University of California, San Diego, CA, USA, pp. 1-16, Jun. 21-24, 2010.
Welinder, Peter, et al., "The Multidimensional Wisdom of Crowds"; http://www.vision.caltech.edu/visipedia/papers/WelinderEtalNIPS10.pdf, pp. 1-9, 2010.
Yu, Kai et al., "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.
Zhang, Z. et al. A Flexible new technique for camera calibration. IEEE Transactions on Pattern Analysis and Machine Intelligence (vol. 22, Issue: 11, pp. 1330-1334, Nov. 2000).
Zhou, Bolei et al., "A Phase Discrepancy Analysis of Object Motion", Asian Conference on Computer Vision, pp. 225-238, Springer Berlin Heidelberg, 2010.
Australian Patent Office, Examination Report No. 1 for Appl. No. 2019206509, mailed Feb. 19, 2024, 5 pages.
European Patent Office, Extended European Search Report for EP Appl. No. 23204126.9, issued Jan. 4, 2024, 5 pages.

* cited by examiner

US 12,071,101 B2

REAL-TIME REMOTE CONTROL OF VEHICLES WITH HIGH REDUNDANCY

CROSS-REFERENCE TO RELATED APPLICATIONS

This application is a continuation of U.S. patent application Ser. No. 16/243,821 filed Jan. 9, 2019, now U.S. Pat. No. 11,312,334 issued on Apr. 26, 2022, which claims the benefits of U.S. Provisional Patent Application No. 62/615,377, filed on Jan. 9, 2018, each of which is incorporated by reference herein in its entirety.

TECHNICAL FIELD

This document relates to vehicle monitoring and control.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services.

SUMMARY

Disclosed are devices, systems and methods for monitoring and controlling a vehicle, such as a passenger car or a truck, in a robust and reliable manner. This may be achieved by combining vehicle information from multiple resources, either locally on or near the vehicle, or remotely from servers or databases, in a linked communication network.

In one aspect, the disclosed technology can be used to provide a method for vehicular monitoring and control of a vehicle. This method includes receiving at the vehicle a first copy of a control command for an operation of the vehicle over a first communication protocol; receiving at the vehicle a second copy of the control command over a second communication protocol; comparing the received first and second copies of the control command to determine whether the first copy is identical to the second copy; executing the control command to execute the operation of the vehicle when the first copy is identical to the second copy; and rejecting the control command to deny execution of the operation of the vehicle when the first copy differs from the second copy.

In another aspect, the disclosed technology can be used to provide a system for vehicular monitoring and control of one or more trucks, wherein each of the one or more trucks includes a first electronic control unit; and a second electronic control unit. The first electronic control unit is configured to receive a first copy of a control command over a first communication protocol. The second electronic control unit is configured to receive a second copy of the control command over a second communication protocol, determine whether the first copy is identical to the second copy, execute the control command when the first copy is identical to the second copy, and reject the control command when the first copy differs from the second copy.

In yet another aspect, the disclosed technology can be used to provide a method of controlling a vehicle including a plurality of types of communication protocols. The method includes: checking as to whether first, second, and third communication protocols are functioning properly at the vehicle; receiving a first copy of a control command for an operation of the vehicle over the first communication protocol and receiving a second copy of the control command over a second communication protocol if the first and second communication protocols are functioning properly at the vehicle; receiving the first copy of the control command over the second communication protocol and receiving the second copy of the control command over the third communication protocol if the second and third communication protocols are functioning properly at the vehicle while the first communication protocol is not functioning properly; receiving the first copy of the control command over the first communication protocol and receiving the second copy of the control command over the third communication protocol if the first and third communication protocols are functioning properly at the vehicle while the second communication protocol is not functioning properly; comparing the received first and second copies of the control command to determine whether the first copy is identical to the second copy; executing the control command to execute the operation of the vehicle when the first copy is identical to the second copy; and rejecting the control command to deny execution of the operation of the vehicle when the first copy differs from the second copy.

In yet another aspect, the disclosed technology can be used to provide a system for vehicular monitoring and control of one or more vehicles, wherein each of the one or more vehicles includes: a first electronic control unit including one or more Global Positioning System (GPS) modules configured to access satellites to provide real time location information to the vehicle; a second electronic control unit including a telematics module configured to connect to a Long-Term Evolution (LTE) protocol and a memory configured to store information on a distribution of LTE signals; and a battery module configured to supply power to the first and second electronic control units. The first and second electronic control units communicate with each other using one or more communication protocols. Each of the one or more vehicle is configured to receive commands in advance upon receipt of a GPS signal indicating the vehicle will enter a road with no coverage of the LTE protocol. The memory is configured to store the commands received in advance.

The above and other aspects and features of the disclosed technology are described in greater detail in the drawings, the description and the claims.

DETAILED DESCRIPTION

Disclosed are devices, systems and methods for real-time remote control of vehicles with redundant communications based on the disclosed technology.

The remote control of vehicles may use real-time commands that can be downloaded and uploaded via communication links with high redundancy and robustness. It can be technically challenging or difficult for various existing telematics systems to meet these requirements for several reasons, including, e.g., (1) the 3G/4G signals in existing wireless communication networks can be unstable, and the wireless communication coverage for the networks is not consistent. For example, a wireless communication network may not be able to provide continuous signal coverage for long periods of time, especially when traveling through rural and suburban areas, and (2) many existing telematics systems have no redundant architectures, which results in the vehicle not being aware of whether the commands are incorrect or whether the control commands are being hacked.

The disclosed technology in this patent document provides solutions that can be used to address the above and other technical issues in remote control of autonomous operation of vehicles with redundant communications. One system implementation of the disclosed technology, shown in FIG. 1, can include: a telematics module 102 (that supports a variety of wireless communication protocols, such as LTE, Wi-Fi, and DSRC), a monitoring module with built-in security functions 104, and a power supply module 106 including one or more batteries 107 and 108.

Figure 1:
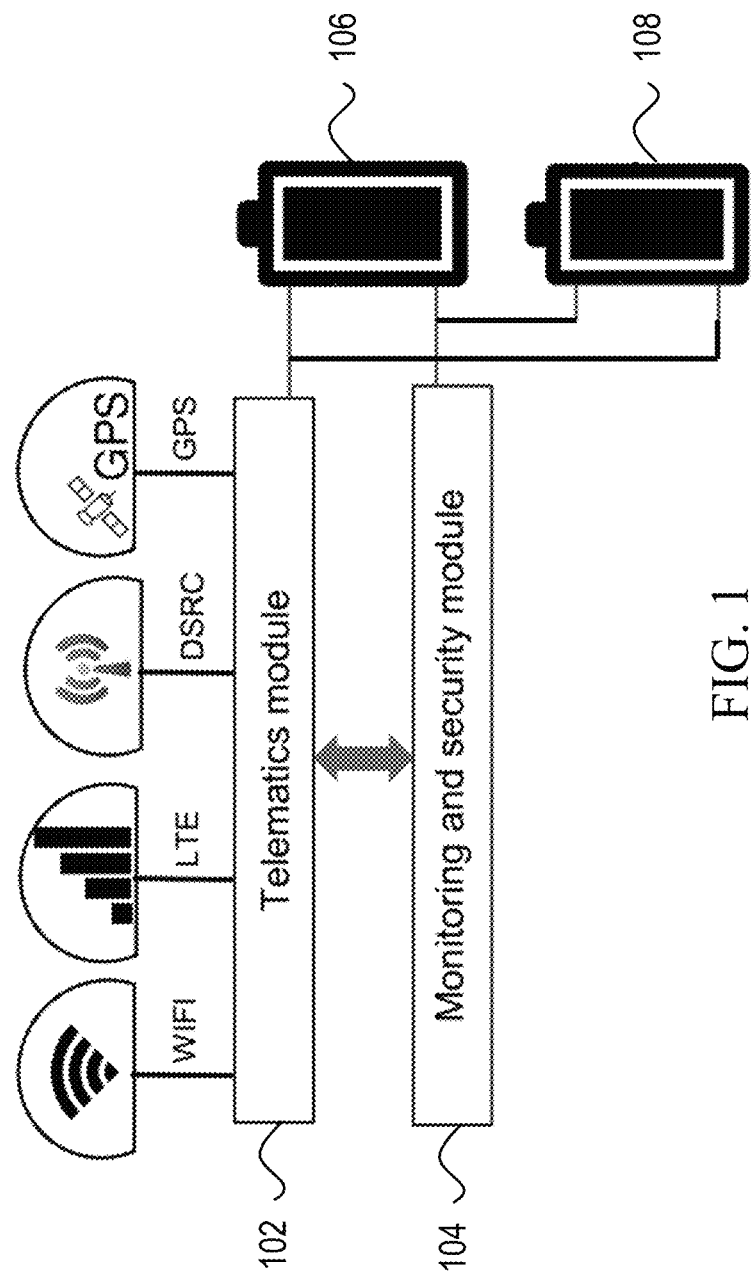
FIG. 1 shows a block diagram of an embodiment for vehicular wireless communication with redundancy.

One of the advantages of the embodiment shown in FIG. 1 is the ability to send control commands using different communication protocols (e.g., Wi-Fi and DSRC, or LTE and dedicated short range communication DSRC) and to check and compare the received messages. If one data link (or equivalently, communication protocol) is temporarily broken, the monitoring module can change to another data link. This ensures that multiple and independent copies of the control command will be received, and can be compared by the monitoring module. If the two copies of the control commands agree, the control command is executed, but if they don't match, the control command is rejected. In an example, this redundancy approach mitigates the effect of hacking one of the communication protocols.

Figure 2:
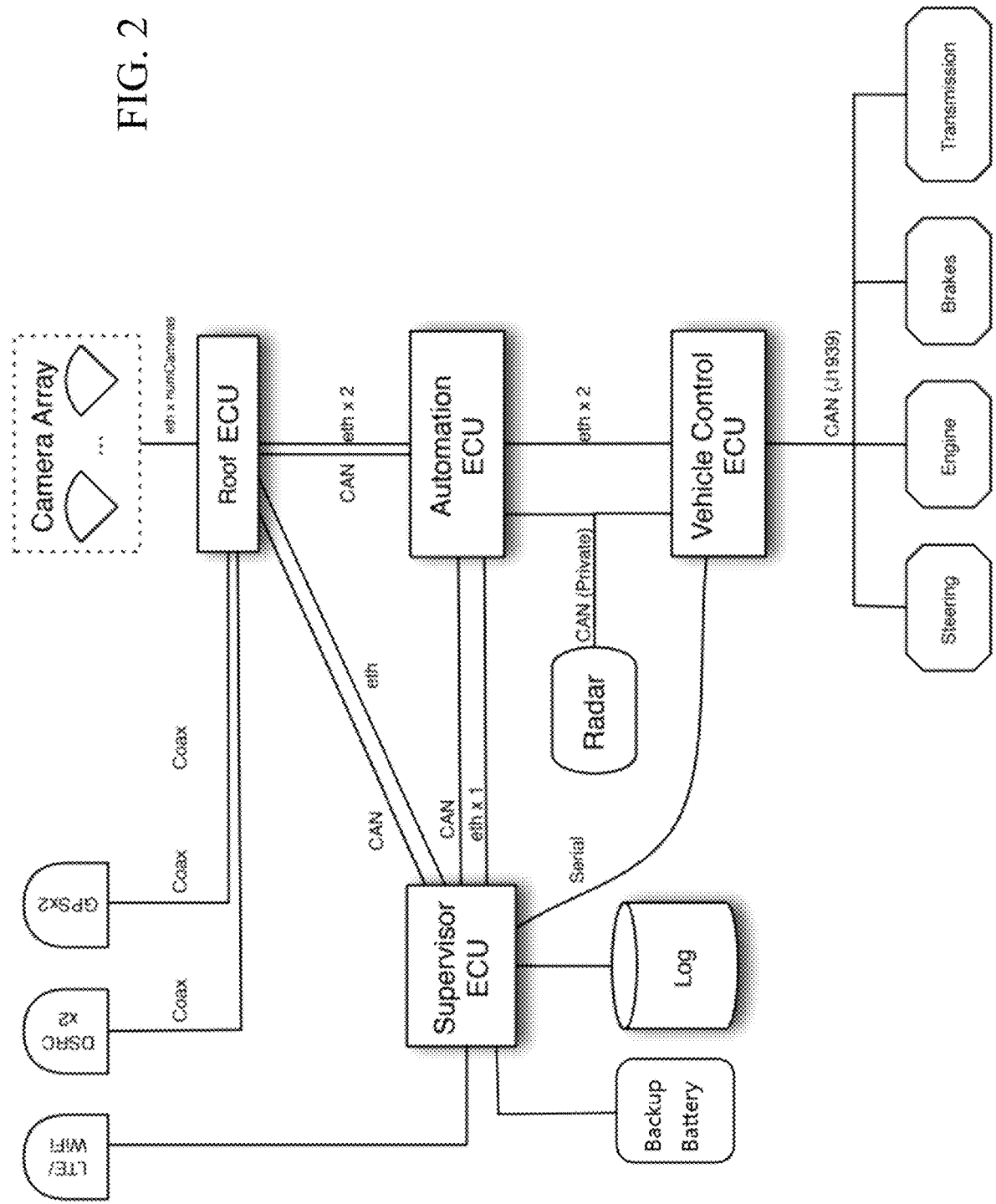
FIG. 2 shows a block diagram of an example of the electric and electronic (EE) architecture of a vehicle designed for autonomous operation.

FIG. 2 shows a block diagram of an example of the Electric and Electronic (EE) architecture of a vehicle that is designed for autonomous operation. In some embodiments, the EE Architecture of the vehicle comprises many components and sub-components, including the Roof electronic control unit (ECU) and the Supervisor ECU, into which embodiments of the disclosed technology may be integrated into. In addition to these two components, there may be a number of other components in the EE Architecture of an autonomous driving vehicle or truck. In an example, the Automation ECU is the central computer of the autonomous driving system, and the Vehicle Control ECU is the vehicle behavior controller.

Figure 3:
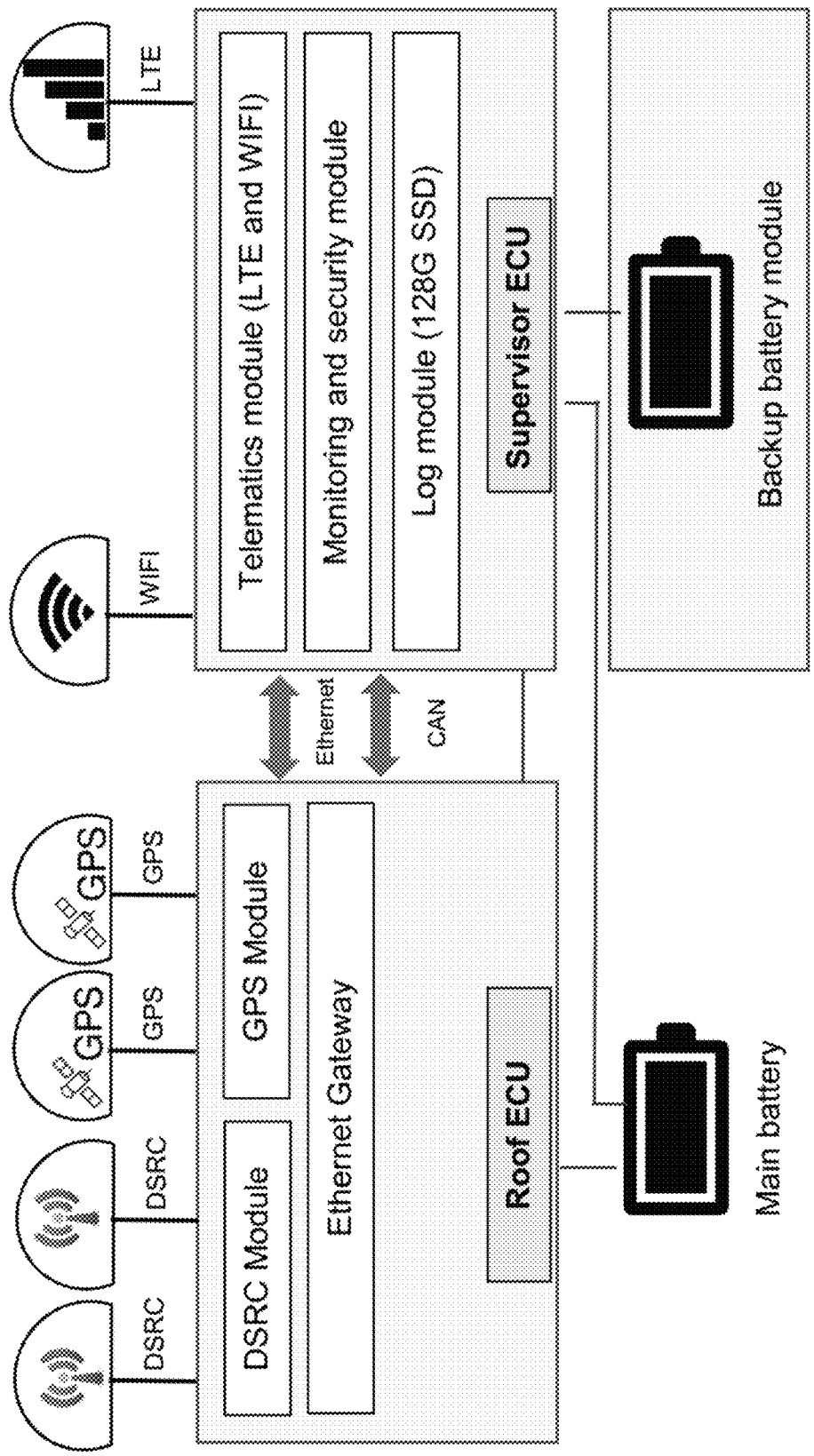
FIG. 3 shows a block diagram of an example of the system architecture for vehicular wireless communication with redundancy.

FIG. 3 shows a block diagram of an example of the system architecture for implementing a method for vehicular wireless communication with redundancy, and is one example of packing the components shown in FIG. 1 into the EE Architecture of FIG. 2. The components, including relevant sub-components and support devices and interfaces, and any salient details are described in the present document.

(1) The Roof ECU may include:

(1.1) the DSRC module, which may comprise two antennas, and can communicate using short-range and medium-range communication protocols;

(1.2) at least two high-accuracy GPS modules, which operate in a manner that is independent of each other and thus may serve as a resilient positioning system with redundancy support; and (1.3) an Ethernet gateway (wired or wireless), which can connect to other Ethernet equipment and be used to communicate with the Supervisor ECU, which can also be accomplished using the CAN, or Controller Area Network.

(2) The Supervisor ECU may include:

(2.1) the telematic module, which implements LTE and Wi-Fi communication protocols. The telematics module may also be configured to communicate with the background system using a heartbeat signal;

(2.2) the monitoring and security module, which monitors all communication and the status of at least some sensors installed on the vehicle. The monitoring and security module may determine errors based on signals received from the sensors. The errors may be categorized according to their severity and a corresponding action to be taken upon detection of the error. For example, if a critical error is detected, the truck may be stopped due to the emergency. In some embodiments, the monitoring and security module comprises special standalone security chips to verify the data being communicated. The verification may be performed using a variety of techniques, including parity check, hashes, digital certificates, etc. When information may be suspect, the security chip may launch an anti-hacker mechanism. For example, the anti-hacker mechanism may take control and filter out the suspected commands; and (2.3) a log module, which logs certain activities such as key communication messages and other critical information to a storage, e.g., a 128 GB solid-state drive (SSD). The log module may be configured to erase old data on a sliding time window basis if the 128 GB SSD is becoming full (e.g., above a certain percent of use) and new messages are coming in (based on a FIFO sequence), but allow erasures only with the necessary authorities and credentials.

In some embodiments, the Supervisor ECU may locally store a map of LTE coverage, and may use this map in conjunction with the GPS system in the Roof ECU to circumvent the problems with lack of LTE coverage in rural and suburban areas. For example, the GPS units can be used to determine a current position and a route between the current position and a destination. This strategy may minimize lack of LTE coverage along the route.

When it is determined that a lack of LTE coverage along the route is inevitable, any control commands that are to be used during that period are downloaded prior to entering that geographic area. The GPS modules in the Roof ECU assist in determining locations, etc.

(3) The third component is the backup battery module, which is a whole battery management system. In some embodiments, the battery is a lithium battery with a capacity of 12V/90 Ah, which can supply the whole autonomous system for 2 hours after the shutdown of the main battery, and can supply the Supervisor ECU to work for over 48 hours under low-power mode. In addition, the backup battery module can monitor the current and voltage, and is configured to send a warning signal when a problem is detected. For example, the backup battery module may be pre-programmed with a range of power or current use by various circuits and sensors, and may detect deviations from the pre-programmed ranges. Alternatively, or in addition, the backup battery module may learn typical power usage and may detect deviations based on the learned past history of power utilization.

Figure 4A:
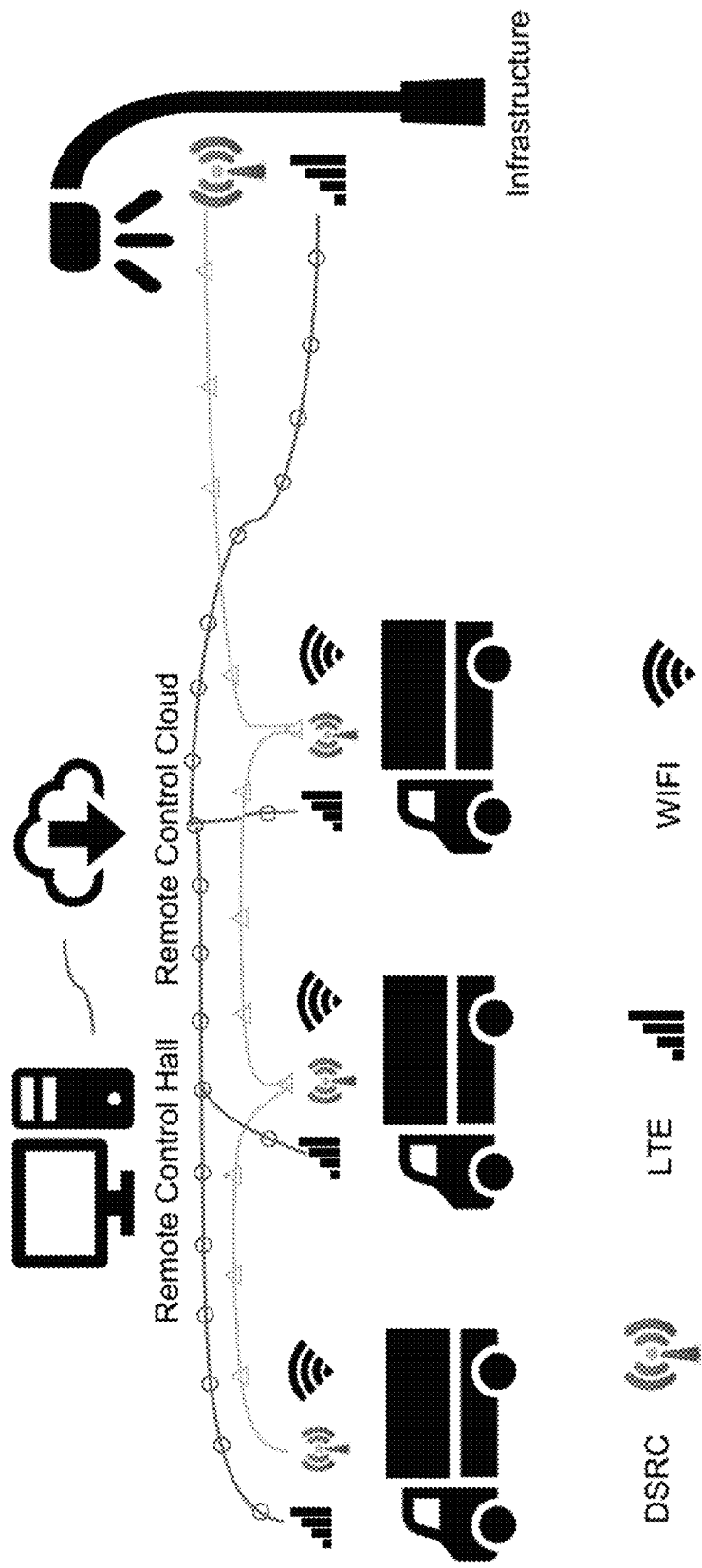
FIGS. 4A, 4B and 4C show various use case examples of redundant communication in a convoy of trucks.
Figure 4B:
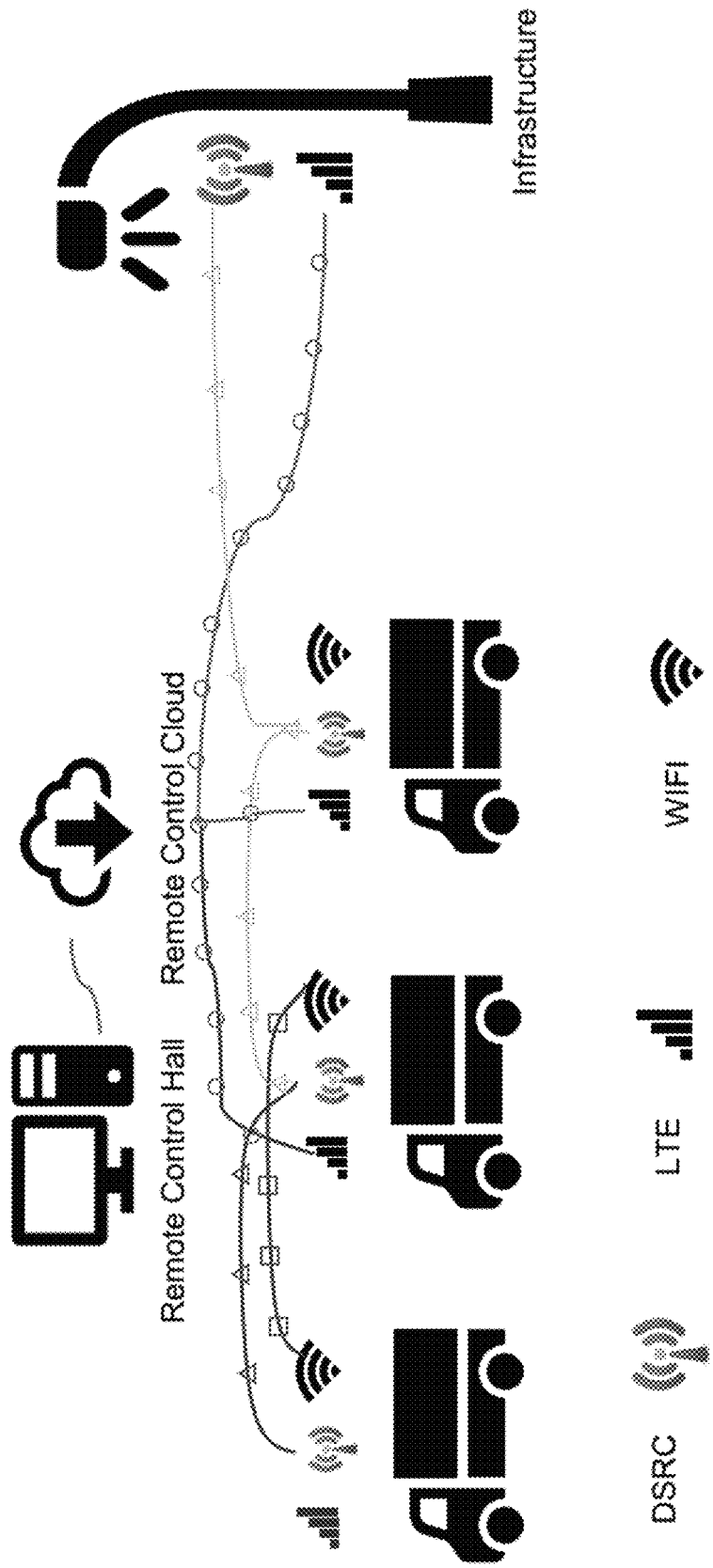
Figure 4C:
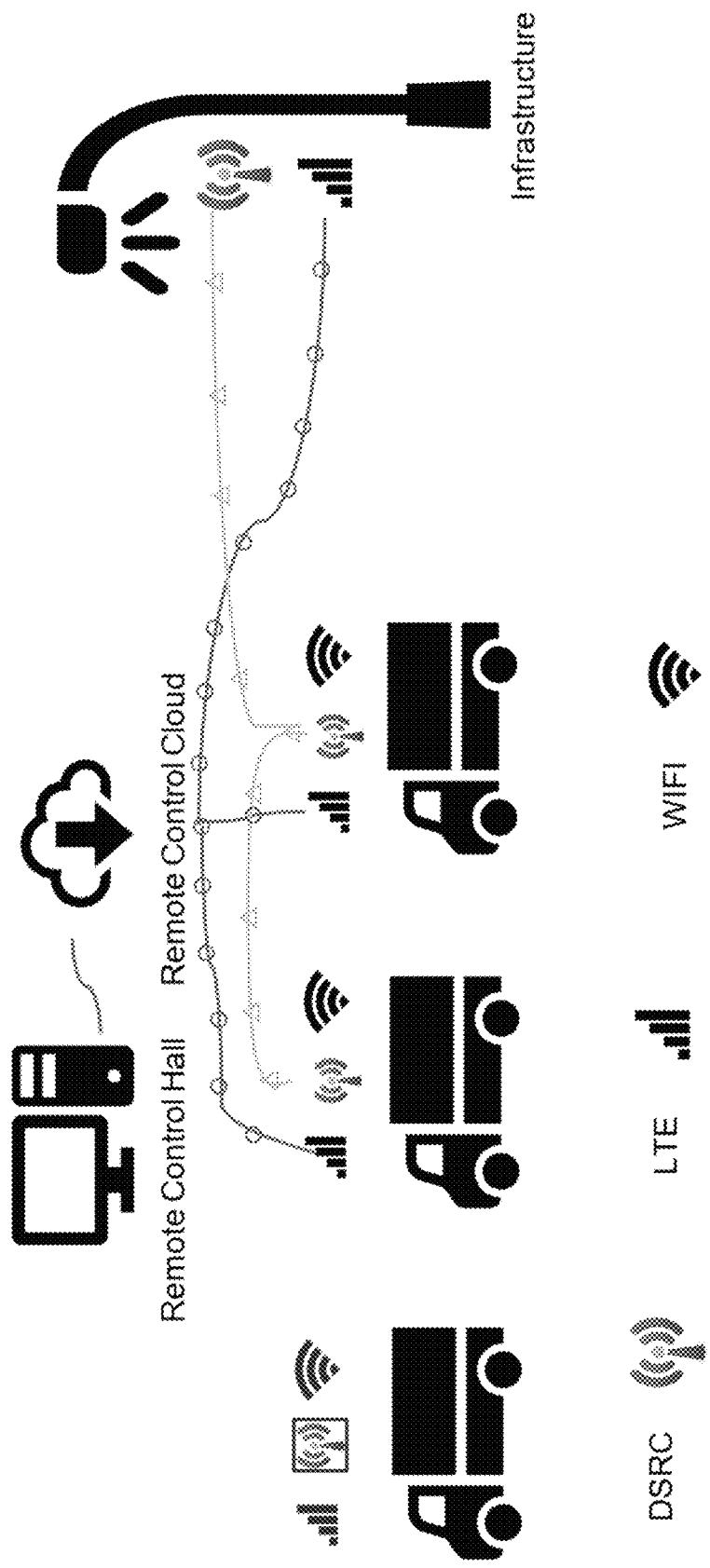

FIGS. 4A, 4B and 4C show examples of various use cases of redundant communications in a convoy of trucks.

FIG. 4A is the case during normal communication, wherein the control commands are sent over at least two different communication protocols. In this example, the LTE protocol is used as the main (or primary) channel for the control commands, and the redundant (or backup, or secondary) channel is the DSRC protocol. During normal operations, when the LTE and DSRC protocols are being used for the control commands, the Wi-Fi protocol does not connect with any other trucks directly. The Wi-Fi protocol may be configured to connect to the mobile phone of the driver if the mobile phone has such a capability. In this mode, the truck W-Fi may operate as a guest node and the driver's cell phone may work as the host point. In some embodiments, no extra data will be sent through this connection except the heartbeat signal which is used to determine whether the redundant connection is functioning as required. However, the driver may use an application on the cell phone to get or download data as requested.

For the download channel, the Supervisor ECU receives the control commands from the LTE and DSRC protocols, and determines whether the received commands are reliable. In contrast, the Remote Control Hall (shown in FIG. 4A) is responsible for this verification for the upload channel. This validation procedure applies as described with a primary LTE protocol and a secondary protocol that may be either the DSRC or Wi-Fi.

FIG. 4B shows a second example case wherein the LTE module of the first truck is broken or there exist suspicious commands. In this case, the DSRC protocol will become the primary protocol for the first truck, and the Supervisor ECU will disconnect the LTE module. If the Wi-Fi protocol on the mobile phone of the drive is functioning properly, it will now serve as the backup (or secondary) communication protocol for the control commands. If the Wi-Fi protocol on the mobile phone of the drive is not functioning properly, the Wi-Fi module will connect to other trucks' Wi-Fi modules as a guest and communicate with them directly.

FIG. 4C shows a third example case wherein all communication modules and protocols are inactive for one or more of the trucks in the convoy. For example, the LTE, DSRC and Wi-Fi modules are disconnected in the first truck. In this case, all the communication modules are forced into high-power mode to detect a potential connection using a weak signal. If it is determined that the disconnection of the communication modules was predicted (e.g. a truck was configured to travel onto a freeway located in an uninhabited desert), control commands are sent in advance of the use and the last valid command is activated. On the other hand, if it is determined that the disconnection was unpredicted, the autonomous system will be forced to a safe mode (e.g. low cruising speed, warning lights on) until a new valid control command is received.

Figure 5:
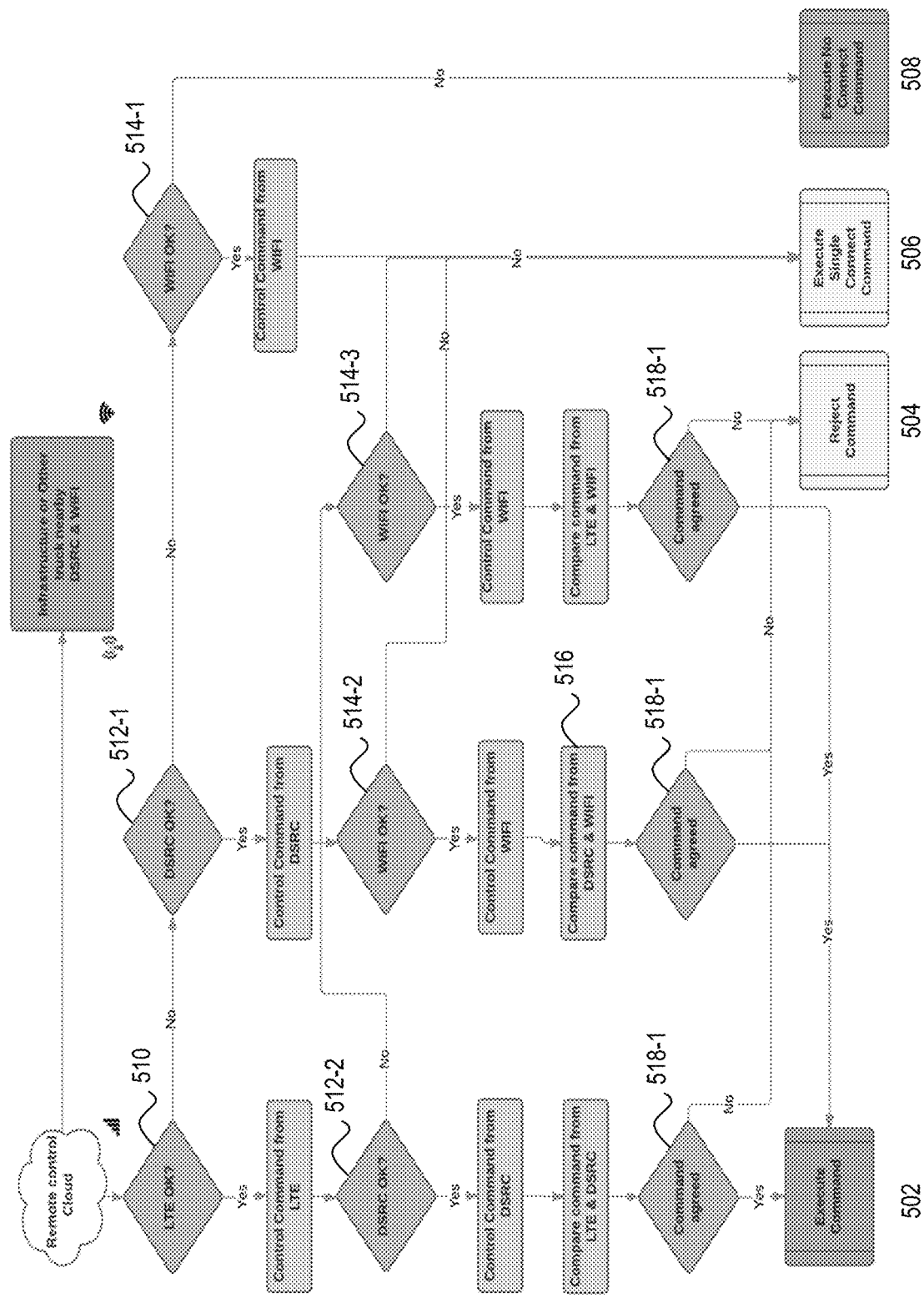
FIG. 5 shows a flowchart of an example method of redundant communication for vehicular wireless communication.

FIG. 5 shows a flowchart of an example of a method of redundant communications for vehicular wireless communications. The "Execute Command" block 502 is a process to execute a command when commands from two different communication protocols (or modules) are in agreement. In contrast, when commands from two different protocols are not in agreement, the command is deemed to be rejected and thus will not be executed as shown by the "Reject Command" block 504. In some embodiments, and as shown in decision boxes 510, 512-1, 512-2 and 514-1, 514-2 and 514-3, the LTE communication protocol may be used as the primary communication protocol, with DSRC and Wi-Fi ranked second and third, respectively. Thus, in the example shown in FIG. 5, the control command over the DSRC protocol is compared to the one received over the Wi-Fi protocol (block 516) only if the LTE protocol is not operational or unavailable.

FIG. 5 also shows that, when control commands are received over two different (and redundant) protocols, it is determined whether the commands are in agreement (in decision boxes 518-1, 518-2 or 518-3), and then the commands are either executed (block 502) or rejected (block 504). In this example, a single connect command (block 506) may not be executed and may be flagged as an error condition.

However, if a control command is only received using one protocol (e.g., either LTE or DSRC or Wi-Fi, and when two out of the three example protocols are not operating or unavailable), then the system proceeds to establish the single connect as shown by the "Execute Single Connect Command" block 506. And in the case when none of the communication modules (or protocols) are active, there can be no communication channel as shown by the "Execute No Connect Command" block 508.

In an implementation of the disclosed technology, a method of controlling a vehicle includes a plurality of types of communication protocols. The method includes: checking as to whether first, second, and third communication protocols are functioning properly at the vehicle; receiving a first copy of a control command for an operation of the vehicle over the first communication protocol and receiving a second copy of the control command over a second communication protocol if the first and second communication protocols are functioning properly at the vehicle; receiving the first copy of the control command over the second communication protocol and receiving the second copy of the control command over the third communication protocol if the second and third communication protocols are functioning properly at the vehicle while the first communication protocol is not functioning properly; receiving the first copy of the control command over the first communication protocol and receiving the second copy of the control command over the third communication protocol if the first and third communication protocols are functioning properly at the vehicle while the second communication protocol is not functioning properly; comparing the received first and second copies of the control command to determine whether the first copy is identical to the second copy; executing the control command to execute the operation of the vehicle when the first copy is identical to the second copy; and rejecting the control command to deny execution of the operation of the vehicle when the first copy differs from the second copy.

In some implementations of the disclosed technology, the method further includes, if only one of the first, second, and third communication protocols is functioning properly, receiving the first copy of the control command over the one of the first, second, and third communication protocols and executing the control command. In some implementations of the disclosed technology, the first communication protocol is a Long-Term Evolution (LTE) protocol, the second communication protocol is a dedicated short-range communication (DSRC) protocol, and the third communication protocol is a Wi-Fi protocol. In some implementations of the disclosed technology, the Wi-Fi protocol includes a Wi-Fi protocol on the vehicle or a Wi-Fi protocol on the mobile phone in the vehicle or both the Wi-Fi protocol on the vehicle and the Wi-Fi protocol on the mobile phone in the vehicle. In some implementations of the disclosed technology, the Wi-Fi protocol includes connecting to Wi-Fi modules of other vehicles and communicating with the Wi-Fi modules of other vehicles directly. In some implementations of the disclosed technology, the method further includes receiving a heartbeat signal using a Wi-Fi protocol of the vehicle as a guest node and a mobile phone in the vehicle as a host point to determine whether the Wi-Fi protocol is functioning properly.

Examples of Wireless Communication Modules

In some embodiments and with reference to the DSRC module (1.1), the DSRC antennas may be of different types, or configured differently. For example, each of the antennas may be selected from a set with features that include one-way or two-way, and short-range to medium-range communication capabilities. In another example, the DSRC antennas may be configured to use different DSRC protocols (which may operate at different frequencies and using different bandwidths). For example, the US Federal Communications Commission (FCC) allocated 75 MHz of spectrum in the 5.9 GHz band, whereas the European Telecommunications Standards Institute (ETSI) allocated 30 MHz of spectrum in the 5.9 GHz band. Furthermore, DSRC systems in Europe, Japan and U.S. may not be cross-compatible and operate in different frequency bands (e.g. 5.8 GHz, 5.9 GHz or even infrared) and at different baud rates.

In some embodiments and with reference to GPS modules (1.2), the two GPS antennas are configured with independent stable oscillators, which provides excellent holdover performance and signal quality. Furthermore, the two GPA antennas inherently provide robustness against the situation in which one of the two GPS antennas fails.

In other embodiments, two different GPS systems may be accessed by each of the two independent antennas. For example, any two of the following systems provide independent location and positioning: the US GPS system (originally, the Naystar GPS), the Russian Global Navigation Satellite System (GLONASS), the European Union Galileo positioning system, China's BeiDou Navigation Satellite System, the Indian Regional Navigation Satellite System (IRNSS, operationally known as NAVIC), and Japan's Quasi-Zenith Satellite System (QZSS).

In some embodiments and with reference to the telematic module (2.1), the "heartbeat signal" that can be periodically broadcast by each truck or vehicle (using any of the communication protocols or modules), may include key information such as speed, acceleration and brake status, which can be detected and interpreted by other vehicles in close proximity.

In some embodiments and with reference to the monitoring and security module (2.2), the monitoring and security module may be configured to counter against hacking attempts. For example, when a route has been established between a starting (or current) location and a destination, if the truck's GPS indicates that the current position is only a few blocks away from the predetermined route, this may be interpreted as a necessary deviation due to a unplanned re-route. On the other hand, if the GPS indicates that the truck is moving in the opposite direction than was predetermined for any significant period of time, the monitoring and security module may take the necessary measures. The truck may be forced to stop, or control commands may be uploaded from the truck to an external monitoring service (e.g. the Remote Control Hall or Cloud).

In some embodiments and with reference to log module (2.3), the log module for logging or keeping records of certain activities may be implemented in various ways, including, e.g., using a commercial off-the-shelf (COTS) component, or a custom-built module that, in an example, supports a UNIX filesystem, and is specifically designed for operations in vehicular monitoring and control.

In some embodiments and with reference to (1) and (2), the protocols enumerated herein are not to be construed as limiting, and may be modified or augmented to inter-operate with other short-range wireless protocols such as IEEE 802.11, Bluetooth, Communication, Air-interface, Long and Medium range (CALM), and other methods of transmission in Intelligent Transportation System (ITS) implementations.

In some embodiments and with reference to the Roof ECU (1) and the Supervisor ECU (2), and in the context of FIGS. 4A, 4B and 4C, the Roof ECU and Supervisor ECU in each truck may be configured to communicate with each other to ensure a "convoy" operation with minimal human intervention. Alternatively, any of the aforementioned protocols may be used to establish communication between drivers of the trucks. For example, certain control commands may be received by one or the trucks (from the Remote Control Hall or Cloud), and then transmitted to another truck to serve as a redundant signal, or for verification (either for the first time, or as a backup). Each of the protocols may be used individually, or in combination, to establish peer-to-peer communications.

In some embodiments and in the context of FIGS. 4A, 4B and 4C, the Remote Control Hall or Cloud are the server-side (or control center side) components that enable real-time remote control of vehicles with high redundancy. Commands that provide autonomous control or monitoring requests may be sent to one or more trucks in a convoy using different communication protocols, as described above.

In some embodiments, the server-side Remote Control Hall or Cloud is able to track a convoy of trucks, and provide control commands to coordinate travel across divergent routes. In these cases, the individual trucks are able to monitor their own metrics and received commands, but may not be able to communicate with all of the other trucks, but the Remote Control Hall or Cloud is able to leverage different communication protocols to communicate with each truck in the convoy, irrespective of their specific communication protocol coverages.

In some embodiments, the Remote Control Hall or Cloud may transmit control commands after having received responses to monitoring requests from a single truck or one or more of the trucks in a convoy. For example, if responses from a particular truck are received over different communication protocols and do not agree with each other, a control command for that particular truck to either stop or take precautionary measures may be transmitted using one or more communication protocols.

Figure 6:
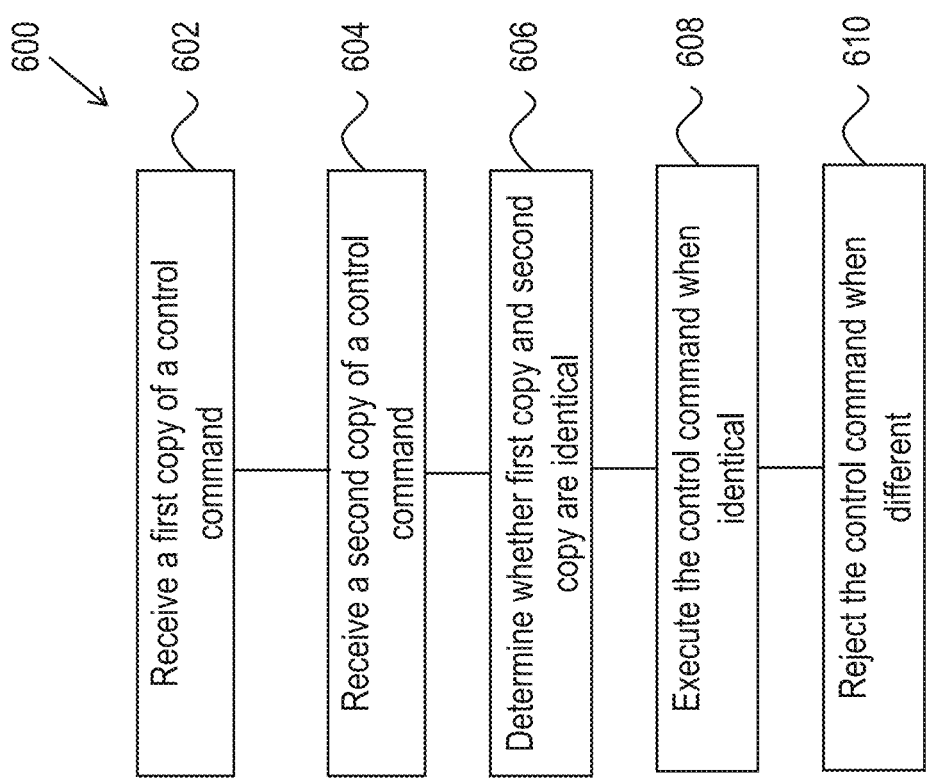
FIG. 6 is a flowchart for another example method of controlling a vehicle remotely.

FIG. 6 is a flowchart for an example of a method 600 of controlling a vehicle remotely. The method 600 includes, at step 602, receiving a first copy of a control command over a first communication protocol. As described with reference to FIGS. 4A, 4B and 4C, the first communication protocol may be LTE. The control command may also be made secure using digital security techniques such as encryption.

The method 600 includes, at step 604, receiving a second copy of the control command over a second communication protocol. As described with reference to FIGS. 4A, 4B and 4C, the second communication protocol may be DSRC or Wi-Fi (an IEEE local area network protocol). The control command may also be made secure using digital security techniques such as encryption. In some embodiments, the second communication protocol is different from the first communication protocol, which provides high redundancy for communications.

The method 600 includes, at step 606, determining whether the first copy is identical to the second copy. In some embodiments, the control command is over the download channel and the Supervisor ECU may decide whether the two received copies are in agreement. In other embodiments, the control command is over the upload channel and the Remote Control Hall may determine whether the first copy is identical to the second copy.

The method 600 includes, at step 608, executing the control command when the first copy is identical to the second copy.

The method 600 includes, at step 610, rejecting the control command when the first copy differs from the second copy.

Figure 7:
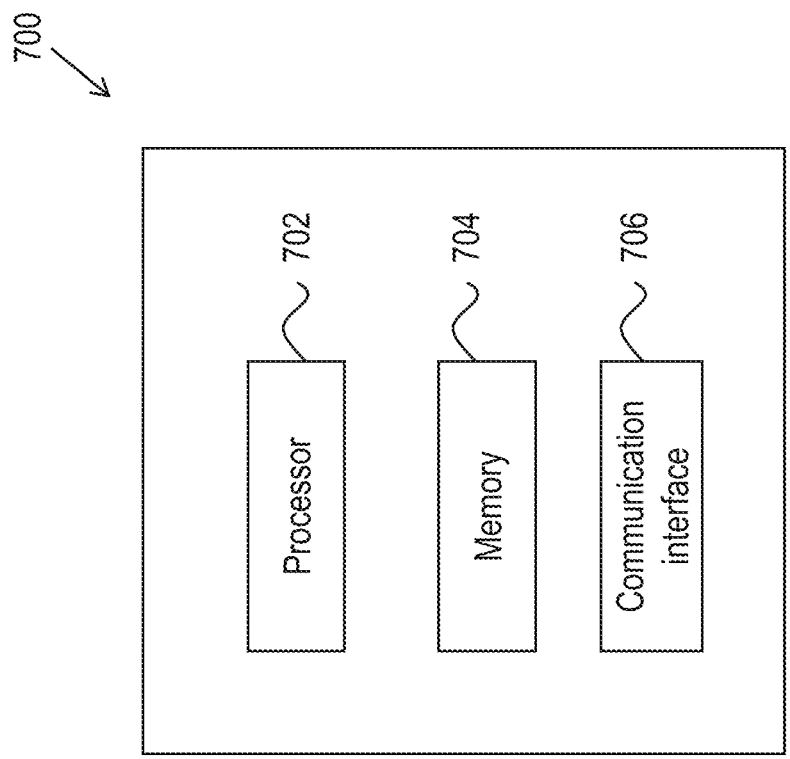
FIG. 7 shows an example of a hardware platform that can implement some techniques described in the present document.

FIG. 7 shows an example of a hardware platform 700 that can be used to implement some of the techniques described in the present document. For example, the hardware platform 700 may implement the method 600 or may implement the various modules described herein. The hardware platform 700 may include a processor 702 that can execute code to implement a method. The hardware platform 700 may include a memory 704 that may be used to store processor-executable code and/or store data. The hardware platform 700 may further include a communication interface 706. For example, the communication interface 706 may implement one or more of the communication protocols (LTE, Wi-Fi, and so on) described herein.

In some implementations of the disclosed technology, a system for vehicular monitoring and control of one or more vehicles includes: a first electronic control unit including one or more Global Positioning System (GPS) modules configured to access satellites to provide real time location information to the vehicle; a second electronic control unit including a telematics module configured to connect to a Long-Term Evolution (LTE) protocol and a memory configured to store information on a distribution of LTE signals; and a battery module configured to supply power to the first and second electronic control units. The first and second electronic control units communicate with each other using one or more communication protocols. Each of the one or more vehicle is configured to receive commands in advance upon receipt of a GPS signal indicating the vehicle will enter a road with no coverage of the LTE protocol. The memory is configured to store the commands received in advance.

In some implementations of the disclosed technology, the one or more GPS modules are independent from each other. The second electronic control unit further includes a security module configured to control the vehicle in an emergency situation or upon receipt of suspicious information. the one or more communication protocols connecting the first and second electronic control units communicate with each other includes Ethernet or Controller Area Network (CAN) or a combination of Ethernet and CAN. The memory is further configured to store communication messages received by the first and second electronic control units. The battery module includes a main battery and a backup battery, and wherein the backup battery is configured to supply power to the second electronic control unit when the main battery is not available.

In some implementations of the disclosed technology, the first electronic control unit further includes a dedicated short-range communication (DSRC) module configured to connect to a short-range communication network, and wherein the telematics module of the second electronic control unit is further configured to connect to a Wi-Fi protocol, and wherein the first and second electronic control units are further configured to: check as to whether the LTE, DSRC, and Wi-Fi protocols are functioning properly at the one or more vehicles; receive a first copy of a control command for an operation of the vehicle over the LTE protocol and receive a second copy of the control command over DSRC protocol if the LTE and DSRC protocols are functioning properly at the one or more vehicles; receive the first copy of the control command over the DSRC protocol and receive the second copy of the control command over the Wi-Fi protocol if the DSRC and Wi-Fi protocols are functioning properly at the one or more vehicles while the LTE protocol is not functioning properly; receive the first copy of the control command over the LTE protocol and receive the second copy of the control command over the Wi-Fi protocol if the LTE and Wi-Fi protocols are functioning properly at the one or more vehicles while the DSRC protocol is not functioning properly; compare the received first and second copies of the control command to determine whether the first copy is identical to the second copy; execute the control command to execute the operation of the vehicle when the first copy is identical to the second copy; and reject the control command to deny execution of the operation of the vehicle when the first copy differs from the second copy.

In some embodiments, various techniques and methods described herein may be embodied into a computer-readable program medium storing computer-executable instructions, which when executed by a processor, cause the processor to implement the method.

Implementations of the subject matter and the functional operations and modules described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed:

1. A method comprising:
   periodically broadcasting information including a speed of a vehicle, an acceleration of the vehicle, or a brake status of the vehicle, the information being periodically broadcast to other vehicles within range of the vehicle via a first communication protocol, a second communication protocol, or a third communication protocol;
   receiving, at the vehicle, a first command via the first communication protocol and a second command via the second communication protocol;
   determining whether the first command differs from the second command; and
   in response to determining that the first command differs from the second command,
     receiving, at the vehicle, a third command via the third communication protocol,
     determining whether the second command and the third command are identical, and
     in response to determining that the second command and the third command are identical, executing the third command.

2. The method of claim 1, wherein executing the third command comprises causing the vehicle to operate according to the third command.

3. The method of claim 1, further comprising:
   in response to determining that the second command differs from the third command,
   rejecting the third command.

4. The method of claim 1, further comprising:
   in response to determining that the first command and the second command are identical, executing the second command by causing the vehicle to operate according to the second command.

5. The method of claim 1, further comprising determining that the third command comprises a stop command, wherein the stop command is received from a monitoring center in response to a determination that the vehicle is moving in a direction opposite to a predetermined destination for a threshold period of time.

6. The method of claim 1, wherein the first command is received via a cellular protocol, wherein the second command is received via a dedicated short range communication protocol, wherein the third command is received via a Wi-Fi protocol.

7. The method of claim 1, wherein the first command is received via a cellular protocol, wherein the second command is received via a Wi-Fi protocol, wherein the third command is received via a dedicated short range communication protocol.

8. The method of claim 1, wherein the first command is received via a dedicated short range communication, wherein the second command is received via a Wi-Fi protocol, wherein the third command is received via a cellular protocol.

9. The method of claim 6, wherein the Wi-Fi protocol comprises a Wi-Fi protocol on the vehicle or a Wi-Fi protocol on a mobile phone located in the vehicle.

10. The method of claim 6, further comprising:
    connecting to Wi-Fi modules of other proximate vehicles; and
    communicating directly with the Wi-Fi modules of the other proximate vehicles via the Wi-Fi protocol.

11. The method of claim 6, further comprising:
determining whether the Wi-Fi protocol is functioning properly by
receiving, via the Wi-Fi protocol, a heartbeat signal from the vehicle as a guest node, and
receiving, via the Wi-Fi protocol, a heartbeat signal from a mobile phone in the vehicle as a host point.

12. An apparatus comprising:
at least one processor; and
at least one memory including computer program code, the at least one memory and the computer program code configured to, with the at least one processor, cause the apparatus to:
periodically broadcast information including a speed of a vehicle, an acceleration of the vehicle, or a brake status of the vehicle, the information being periodically broadcast to other vehicles within range of the vehicle via a first communication protocol, a second communication protocol, or a third communication protocol;
receive a first command via the first communication protocol and a second command via the second communication protocol;
determine whether the first command differs from the second command; and
in response to a determination that the first command differs from the second command,
receive, at the vehicle, a third command via the third communication protocol,
determine whether the second command and the third command are identical, and
in response to a determination that the second command and the third command are identical, execute the third command.

13. The apparatus of claim 12, wherein the at least one memory and computer program code are configured to, with the at least one processor, further cause the apparatus to:
determine, based on a signal received from a global positioning system, a current location of the vehicle;
determine, based on the current location and a destination, a route between the current position and the destination;
predict, based on the route and a coverage map, whether communications are unreliable along a portion of the route; and
in response to the prediction that communications are unreliable along the portion of the route, receive additional commands.

14. The apparatus of claim 13, wherein the global positioning system comprises a global navigation satellite system, a Galileo positioning system, a regional navigation satellite system, or a quasi zenith satellite system.

15. The apparatus of claim 12, wherein the at least one memory and computer program code are configured to, with the at least one processor, further cause the apparatus to:
determine that the vehicle has deviated from a route; and
in response to the determination that the vehicle has deviated from the route, take a precautionary measure.

16. The apparatus of claim 15, wherein to take the precautionary measure, the at least one memory and computer program code are configured to, with the at least one processor, further cause the apparatus to cause the vehicle to come to a stop.

17. The apparatus of claim 12, wherein the at least one memory and computer program code are configured to, with the at least one processor, further cause the apparatus to:
predict, based on a route and a coverage map, that communications are reliable along another portion of the route;
determine that the vehicle is located within the other portion of the route;
detect that the first, second, and third communication protocols are disconnected; and
in response to the detection that the first, second, and third communication protocols are disconnected, cause the vehicle to enter a safe mode.

18. The apparatus of claim 17, wherein to cause the vehicle to enter a safe mode, the at least one memory and computer program code are configured to, with the at least one processor, further cause the apparatus to cause the vehicle to reduce its cruising speed or turning on a warning light.

19. A non-transitory computer-readable medium storing instructions that, when executed by at least one processor, cause operations comprising:
periodically broadcasting information including a speed of a vehicle, an acceleration of the vehicle, or a brake status of the vehicle, the information being periodically broadcast to other vehicles within range of the vehicle via a first communication protocol, a second communication protocol, or a third communication protocol;
receiving, at the vehicle, a first command via the first communication protocol and a second command via the second communication protocol;
determining whether the first command differs from the second command; and
in response to determining that the first command differs from the second command,
receiving, at the vehicle, a third command via the third communication protocol,
determining whether the second command and the third command are identical, and
in response to determining that the second command and the third command are identical, executing the third command.

20. The non-transitory computer-readable medium of claim 19, the operations further comprising:
detecting that the first and second communication protocols are disconnected;
in response to detecting that that the first and second communication protocols are disconnected, receiving a fourth command via the third protocol; and
executing the fourth command by causing the vehicle to operate according to the fourth command.

* * * * *